US005472179A

United States Patent [19]

Wendt et al.

[11] Patent Number: 5,472,179

[45] Date of Patent: Dec. 5, 1995

[54] INSERT FOR COOLING BED PLATE TRANSFER GRID

[75] Inventors: Bernard J. Wendt; Darryl R. Wendt, both of Davisburg, Mich.

[73] Assignee: Allor Manufacturing, Inc., Brighton, Mich.

[21] Appl. No.: 316,930

[22] Filed: Oct. 3, 1994

[51] Int. Cl.$^6$ .......... B65G 13/12

[52] U.S. Cl. .......... 266/279; 266/274; 193/35 R

[58] Field of Search .......... 266/274, 279, 266/277; 193/35 R, 35 B, 37; 72/251

[56] References Cited

U.S. PATENT DOCUMENTS

| | | | |
|---|---|---|---|
| 1,676,011 | 7/1928 | Evans | 193/35 R |
| 2,172,379 | 9/1939 | Harris | 193/35 R |
| 3,509,978 | 5/1970 | Redford | 193/35 |
| 4,044,585 | 8/1977 | Buchheit | 72/201 |
| 4,554,813 | 11/1985 | Feldmann et al. | 72/251 |
| 4,787,839 | 11/1988 | Morse | 193/35 B |
| 4,945,746 | 8/1990 | Jakimowicz et al. | 72/251 |
| 5,076,412 | 12/1991 | Huber | 193/35 MD |
| 5,090,547 | 2/1992 | Schafer | 193/35 R |
| 5,265,711 | 11/1993 | Plesh, Sr. | 193/35 R |
| 5,301,785 | 4/1994 | Plesh, Sr. | 193/35 R |

OTHER PUBLICATIONS

DEVA, rollers in a cooling bed for sheet steel in a French rolling mill, Data Sheet 76.26 01.012, Dec. 1988.

*Primary Examiner*—Scott Kastler
*Attorney, Agent, or Firm*—Young, MacFarlane & Wood

[57] ABSTRACT

An insert for use with a cooling bed plate transfer grid including a plurality of longitudinal side grid members and a plurality of transverse cross grid members extending between the side grid members and coacting therewith to define a plurality of grid pockets, each sized to removably receive an insert. The insert includes a housing sized to fit in the pocket and including front and rear end flange portions adapted to seat on successive cross members. The housing is fixedly secured to the successive cross members by J bolts which extend downwardly and beneath the respective cross members for clamping engagement with the respective cross members. The housing further defines a central slot in which a roller is mounted. The roller is mounted on the central journal portion of a pin and the pin further includes rectangular end portions slidably received in vertical slots defined by the housing at opposite sides of the roller. A pair of adjustment screws threadably engage the end portions of the pin and engage the bottom walls of the side slots so that joint rotation of the screws raises and lowers the roller in a translatory manner and differential rotation of the screws selectively tilts the axis of rotation of the roller.

15 Claims, 3 Drawing Sheets

10
10a
10c
10d
12
14
16
10b
2
26

14
10d
10b
22
18a
10a
10c
18g
30
28
18f
18j
18d
20b
18h
18e
24
32
20
10e
18
18c 12
26
12a
3
10a
34
22
18b
20b
18a
22
30
20b
28a
20b
24c
10d
10b
18h
18i
20a
18d
20a
20d
10e
20c
20d
10e
20c
3

26c
12
12a
26
30
18f
18f
28
28a
28
24b
28b
32
24a
24c
28c
28c
26a
18i
18i 10a
18a
18j
22
10c
26
24b
10a
28
10c
18d
22
18a
26
32
26a
28a
28b
28c
24b
24c
24a
18a
18d
18f
18h
18j
18
18e
18i
18c
20b
20d
20a
20
20c

INSERT FOR COOLING BED PLATE TRANSFER GRID

BACKGROUND OF THE INVENTION

This invention relates to transfer grids for metal plates.

When initially formed in a plate mill, metal plates are very hot and must be suitably cooled before further processing. A cooling bed is typically provided over which the plates are slid by the use of chains employing pusher dogs. The bed is constructed to allow plentiful air circulation to the plates for cooling as they traverse the length of the bed.

The cooling bed is typically composed of a plurality of transfer grids with each grid cast as a single piece. Each grid may typically comprise a plurality of parallel longitudinal grid members extending in the direction of travel of the plates and a plurality of transverse cross grid members extending between the longitudinal grid members. The longitudinal grid members project above the cross members so that the support surface for the plates as the plates move over the grid is defined by the longitudinal grid members.

The movement of the metal plates over the grid surfaces generates significant wear on the grid surfaces requiring relatively frequent replacement of the grids at considerable expense. In addition, the undersurfaces of the plates may be marred as they are conveyed along the grid members.

Various attempts have been made to modify the transfer grids to minimize grid wear and to minimize marring of the plates as they are transferred over the grid. For example, it has been proposed to provide inserts which are removably positioned, in retrofit manner, in the pockets defined between the longitudinal and transverse grid members with each insert, when positioned in a pocket in the grid, presenting a roller projecting above the surface of the longitudinal grid members so that the plates move along a plate pass plane defined by the upper surfaces of the rollers, whereby to minimize marring to the undersurfaces of the plates and eliminate wear on the transfer grid.

Whereas these inserts have proven to be helpful in reducing grid wear and minimizing marring of the plates, the available inserts have a complex construction, and hence a rather high cost; employ an adjusting arrangement for the insert roller that makes it difficult to position the roller at the precise desired height and/or to position the circumferential surface of the roller at a level disposition with respect to the grid surface; and require complete removal of the insert from the grid in order to allow replacement of the roller.

SUMMARY OF THE INVENTION

This invention is directed to the provision of an improved insert for a cooling bed plate transfer grid.

More specifically, this invention is directed to the provision of an insert for a cooling bed plate transfer grid that is simple and inexpensive in construction; that allow ready and precise adjustment of the roller to achieve the desired precise roller height and to achieve a level disposition of the circumferential surface of the roller relative to the grid surface; and that allows removal of the insert roller for repair or replacement without removal of the insert.

The invention insert is intended for use with a generally horizontal cooling bed transfer plate grid including a plurality of longitudinal side grid members and a plurality of transverse cross grid members extending between the side grid members and coacting therewith to define a plurality of grid pockets, each sized to removably receive an insert.

According to the invention, each insert includes a housing; means for fixedly but removably positioning the housing in a respective pocket; a roller; and means mounting the roller on the housing for rotation about a transverse axis and operative to selectively adjust the position of the roller relative to the housing. This specific arrangement allows individual adjustment of the roller relative to the insert housing so as to facilitate the precise positioning of the roller.

According to a further feature of the invention, the mounting means for the roller includes means for selectively moving the roller vertically relative to the housing. This arrangement allows the roller to be selectively adjusted relative to the housing to selectively adjust the distance between the top of the roller and the upper grid surface so as to easily and readily move the top of the roller into alignment with the plate pass plane.

According to a further feature of the invention, the mounting means includes means for selectively angularly moving the transverse axis of the roller. With this arrangement, the circumferential surface of the roller may be maintained parallel to the upper grid surface so as to enable the roller to present a maximum circumferential surface area to the undersurface of the plate and minimize marring of the plate.

According to a further feature of the invention, the mounting means includes a pair of vertically extending slots defined by the housing and positioned on opposite sides of the roller and a pin having a central journal portion mounting the roller and opposite end portions respectively slidably disposed in the slots. With this arrangement, joint sliding movement of the pin end portions in the slots translatorily adjusts the vertical position of the roller relative to the housing and differential sliding movement of the pin end portions in the slots angularly adjusts the transverse axis of the roller relative to the housing to facilitate leveling of the circumferential surface of the roller with respect to the plate pass plane.

According to a further feature of the invention, each slot is bounded by a bottom wall and the mounting means further includes a pair of vertically extending screws threadably engaging the respective end portions of the pin and engaging the respective bottom walls at the lower ends of the screws. With this arrangement, the pin, and thereby the roller, may be moved translatorily or angularly in the housing by joint or differential turning of the screws.

According to a further feature of the invention, each slot has an open top. With this arrangement, the pin and roller assembly may be mounted in the housing simply by lowering the pin end portions into the respective slots, the roller may be vertically adjusted relative to the housing by joint rotation of the screws, the roller axis may be angularly adjusted relative to the housing by differential rotation of the screws, and the pin and roller assembly may be removed from the housing for repair or replacement simply by raising the pin end portions upwardly out of the slots.

According to a further feature of the invention, the housing includes front and rear flange portions adapted to be respectively seated on successive grid cross members and a central main body portion sized to fit in the pocket between the adjacent cross members; the roller is mounted on the central main body portion of the housing; and each insert further includes a clamp member mounted on each flange portion of the housing and including a vertical bolt shank having a threaded upper end extending through an opening in the respective flange portion and a nut positioned above each flange portion, threadably engaging the threaded upper end of the respective bolt shank, and operative in response to threaded coaction between the nut and bolt shank to move the clamp member into clamping engagement with an undersurface of the respective grid cross member to clamp the respective grid cross member between the respective clamp member and the respective housing flange portion. This arrangement allows the insert to be readily moved into and out of clamping relation with respect to the grid cross members to thereby facilitate insertion and removal of the inserts in the grid pockets.

According to a further feature of the invention, each clamp member comprises a J bolt including a vertical stem portion, constituting the vertical bolt shank of the clamp member, and a lower horizontal clamp portion extending laterally from the lower end of the stem portion and operative to clampingly engage the undersurface of the respective cross member in response to tightening of the respective nut. This specific arrangement allows an inexpensive readily available hardware item to be utilized to provide rapid and efficient clamping of the insert within the pocket of the transfer grid.

DETAILED DESCRIPTION OF THE PREFERRED EMBODIMENT

Figure 1:
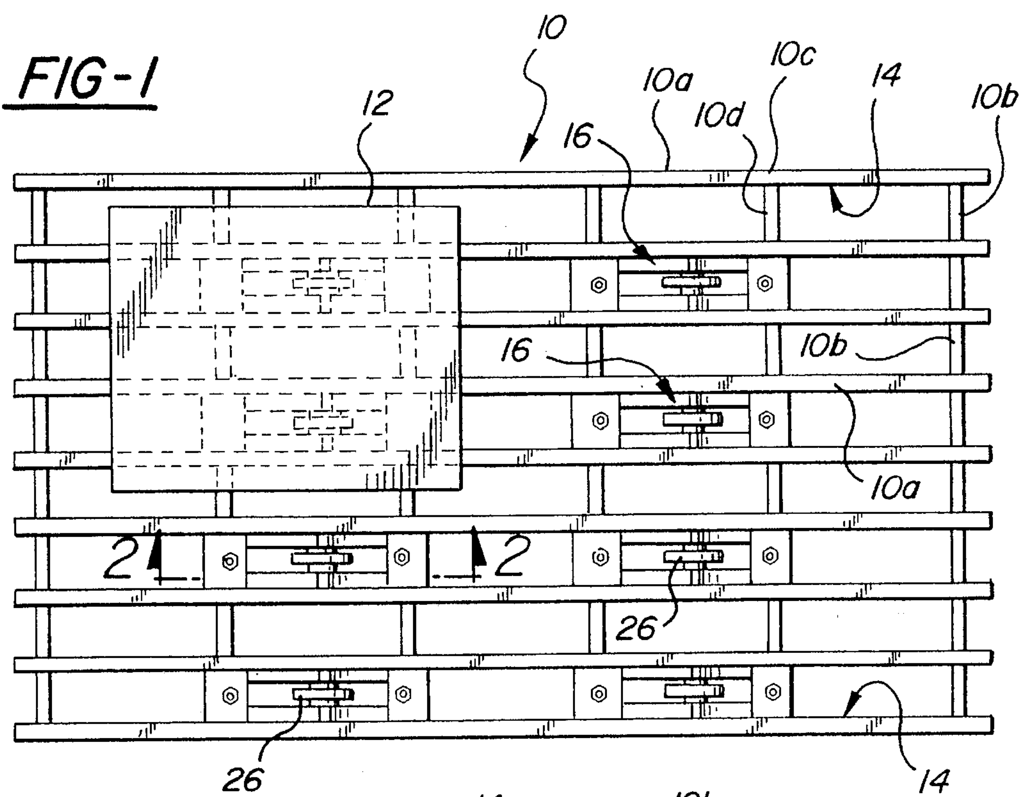
FIG. 1 is a top view of a transfer grid showing the invention inserts positioned therein and showing a plate passing thereover.
Figure 6:
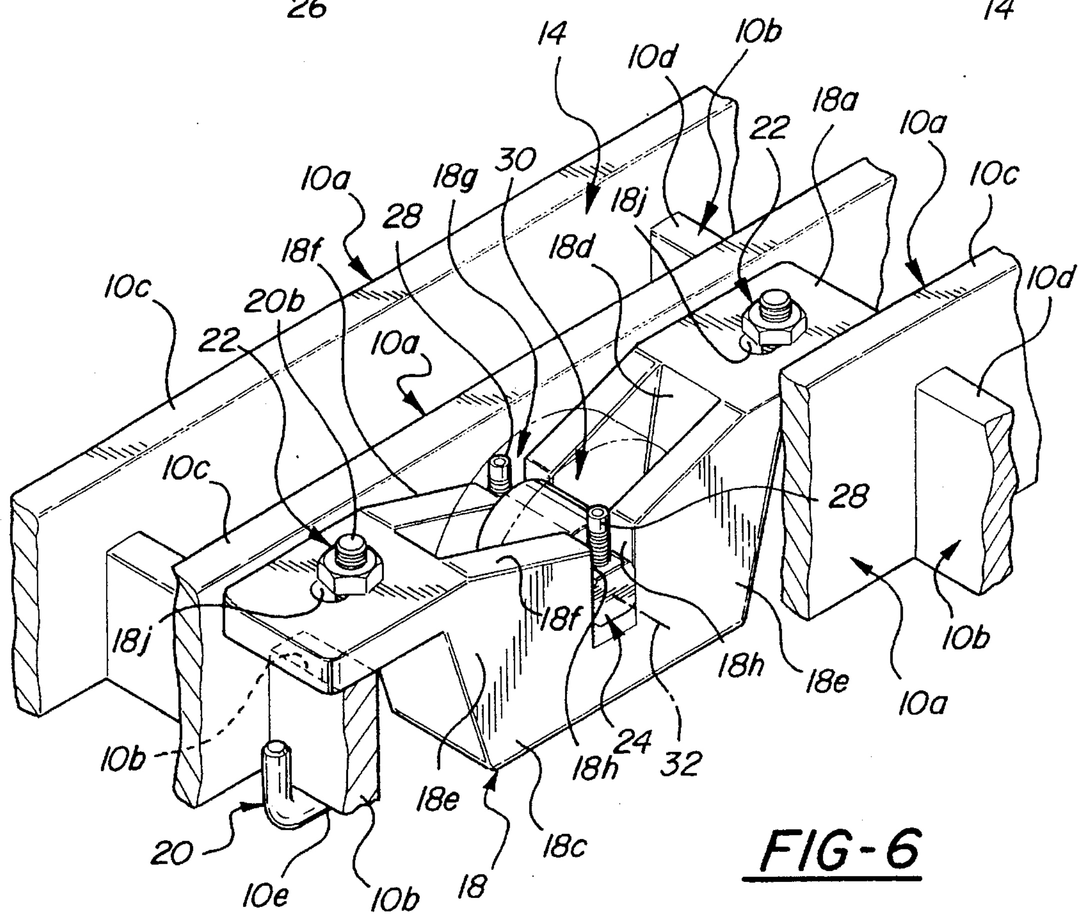
FIG. 6 is a fragmentary perspective view showing details of the mounting of the invention insert in the transfer grid.
Figure 2:
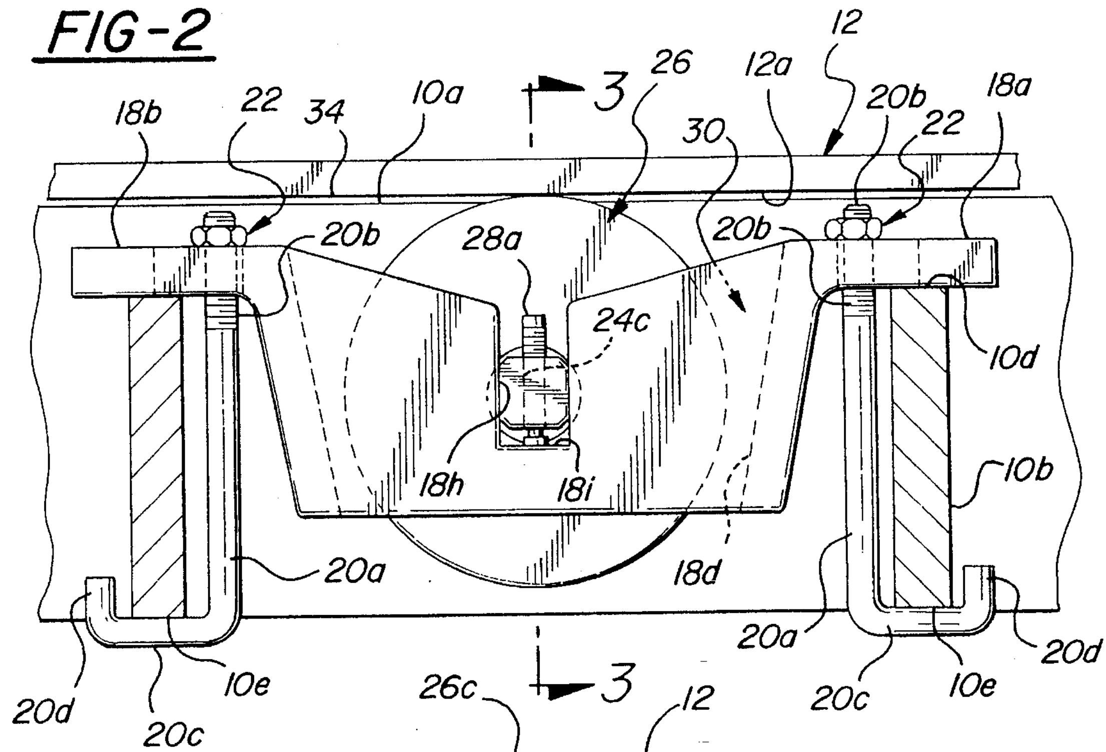
FIG. 2 is a cross-sectional view taken on line 2—2 of FIG. 1.
Figure 3:
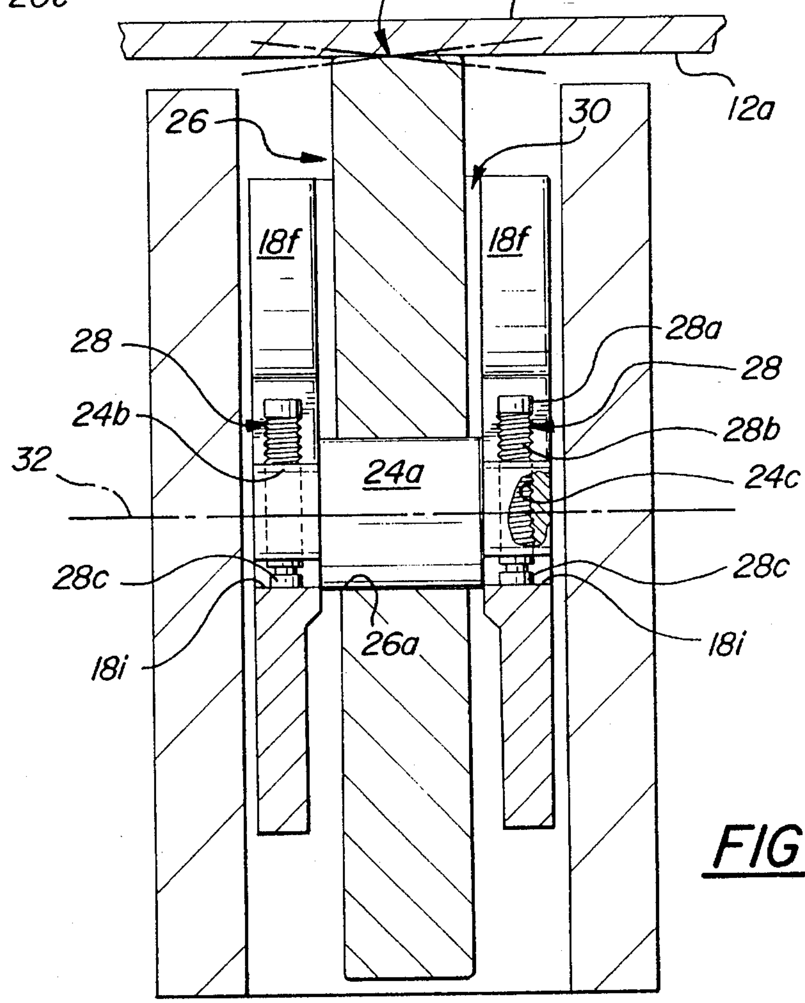
FIG. 3 is a cross-sectional view taken on line 3—3 of FIG. 2.

The invention is illustrated in FIG. 1 in association with a transfer grid 10 utilized to remove hot metal plates 12 from a plate mill to a further processing location and operative to expose the hot plate to a cooling medium as the plate moves across the transfer grid.

The transfer grid 10 is cast and includes a plurality of parallel longitudinal side grid members 10*a* of rectangular cross-section, and a plurality of transverse cross grid members 10*b* of trapezoidal cross-section extending between the side grid members 10*a* and coacting therewith to define a plurality of grid pockets 14 with each pocket 14 bounded on each side by a pair of parallel longitudinal grid members 10*a* and bounded front and rear by successive transverse cross grid members 10*b*. The top surfaces 10*c* of the side grid members are positioned above the top surfaces 10*d* of the transverse grid members so that, in the absence of inserts in accordance with the invention, the plates 12 are moved (as, for example, by chains employing pusher dogs) along a transfer surface defined by the top surfaces 10*c* of the side grid members 10*a*.

According to the invention, and in order to minimize grid wear and minimize marring to the undersurface 12*a* of the plates 12, an insert 16 is removably positioned in selected pockets 14 with the number and positioning of the inserts being determined by the size of the plates 12 and the weight of the plates 12 with the criteria that the plates be supported at all times by the rollers provided by the inserts and that there be sufficient inserts to adequately support the weight of the plates at all times.

Each insert 16 includes a housing 18, a pair of J bolts 20, a pair of lock nuts 22, a pin 24, a roller 26, and a pair of adjusting screws 28.

Whereas the materials of the parts are not critical, the housing 18 and roller 26 may be formed of cast ductile iron and the J bolts 20 and pin 24 may be formed of stainless steel.

Figures 4, 5:
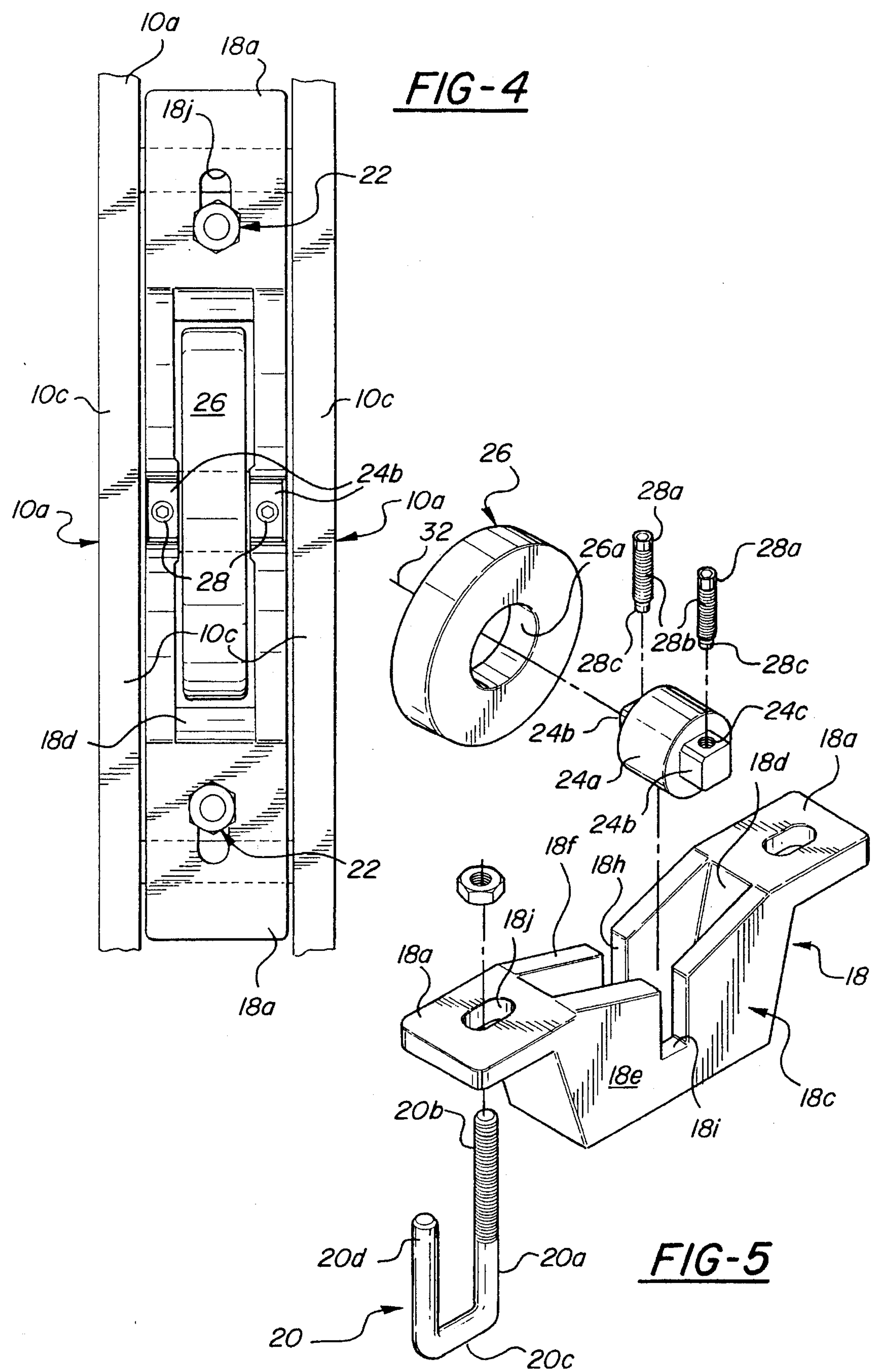
FIG. 4 is a view looking in the direction of the arrow 4 in FIG. 2.
FIG. 5 is an exploded perspective view of an insert according to the invention.

Housing 18 includes front and rear end flange portions 18*a*, 18*b* and a central main body portion 18*c*. Housing 18 is sized to fit in a pocket 14 with rear flange portion 18*b* seated on the top surface 10*d* of a cross member 10*b*, front flange portion 18*a* seated on the top surface 10*d* of a successive cross member 10, and main body portion 18*c* positioned within the pocket. As best seen in FIG. 4, housing 16 has a width slightly less than the distance between adjacent side rails 10*a* so that housing fits readily but snugly between an adjacent pair of side rails with the end flange portions positioned on top of successive cross members and the central main body portion extending downwardly into the pocket.

Main body housing portion 18*c* includes angled end walls 18*d* and spaced side walls 18*e* defining a vertically extending through slot 30 therebetween. The upper surfaces 18*f* of the side walls 18*h* have a V configuration and each side wall defines a central vertically extending slot 18*g*. Each slot 18*g* has an open top and is bounded by vertical side walls 18*h* and a bottom wall 18*i*.

J bolts 20 are commercially available items and, in known manner, include a vertically extending stem portion 20*a* terminating in an upper threaded end portion 20*b* and a horizontal clamp or hook portion 20*c* extending laterally from the lower end of stem portion 20*a* and terminating in an upturned hook end 20*d*. The upper threaded end portion 20*b* of each J bolt is sized to fit in a slot 18*j* formed in a respective housing flange portion 18*a*, 18*b*.

Lock nuts 22 are of known hexagonal form and are adapted for threaded coaction with the upper threaded ends 20*b* of the J bolts.

Pin 24 includes a central journal portion 24*a* of circular cross-sectional configuration and opposite end portions 24*b* of square cross-sectional configuration. End portions 24*b* have a width slightly less than the width of slots 18*g* so that the end portions may be readily moved into and out of the slots 18*g* but are firmly positioned and guided in the slots. Each end portion 24*b* further includes a threaded vertical through bore 24*c*.

Each screw 28 is sized for threaded coaction with a respective through bore 24*c* in a pin end portion 24*b* and includes a hex socket head 28*a*, a threaded main body shank portion 28*b*, and a foot portion 28*c* universally mounted with respect to the shank portion 28*b* so as to be able to seek its own angular position irrespective of the angular position of the shank portion 28*b*.

Roller 26 is sized to fit in the through slot 30 defined between the housing side plates 18*e* and includes a central journal aperture 26*a* sized to be journaled on pin central journal portion 24*a* so as to mount the roller 26 for rotation on the pin about a central transverse axis 32.

In the assembled relation of the insert 16, roller 26 is journaled on pin central journal portion 24*a*; pin 24 is positioned in the housing 18 with pin end portions slidably received in respective slots 18*g* and with the roller positioned in slot 30; and screws 28 are threadably received in through bores 24*c* with the universal screw foot portions 28*c* seated flatly on the bottom walls 18*i* of the respective slots. In this assembled configuration the insert may be readily installed in a grid pocket 14 and may be readily removed from the pocket.

To install an insert in a pocket 14, the insert is lowered into the pocket to seat front and rear housing flange portions 18*a*, 18*b* on the respective successive cross grid members forming the forward and rearward bounds of the pocket; the J bolts 20 are moved upwardly to position hook portion 20*c* under and proximate the undersurfaces 10*e* of the respective cross-grids 10*b* and pass the upper threaded ends 20*b* of the bolts upwardly through the respective slots 18*j*; and lock nuts 22 are threadably engaged with the upper threaded ends of the bolts and turned in a tightening direction to pull the bolts upwardly and move the bolt clamp portions 20*c* into clamping engagement with grid undersurfaces 10*e*, whereby to clamp the respective cross members between a housing end flange portion 18*a*, 18*b* and a J hook clamp portion 20*c* and fixedly position the insert in the grid pocket.

In order to adjust the insert so as to properly and precisely position roller 26 relative to the transfer grid, screws 28 are selectively adjusted (utilizing a suitable tool inserted in the hex head of the screws) to selectively move pin end portions 20*b* upwardly and downwardly in their respective slots 18*g*. Specifically, in order to translatorily adjust the roller to a position in which the top 26*b* of the roller lies on the plate pass plane 34 of the transfer grid, the screws 28 are turned jointly and by equal amounts to raise or lower the roller to position the top 26*b* of the roller precisely on the plate pass plane 34. Further, in order to move the circumferential surface 26*c* of the roller into a position in which it is precisely level with or parallel to the plate pass plane 34, screws 28 are moved differentially in order to selectively tilt the rotational axis 32 of the roller and selectively bring the circumferential surface 26*c* of the roller into precise parallel relationship with the plate pass plane.

Thus, by ready and straightforward joint and selective turning of the screws 28, the top of the roller 26 may be moved into precise alignment with the height of the plate pass plane and the circumferential surface 26*c* of the roller may be moved into precise parallelism with respect to the plate pass plane. It will be understood that positioning of the top of each roller precisely at the height of the plate pass plane is important to the efficient movement of the plates over the transfer grid and the precise positioning of the circumferential surface 26*c* of the roller parallel to the plate pass plane ensures that the entire circumferential surface of each roller will engage the undersurface 12*a* of the plate so as to distribute the load of the plate uniformly over the roller and so as to avoid scouring of the undersurface of the plate resulting from one or the other circumferential edges of the roller digging into the plate. In order to remove the insert from the pocket 14 it is only necessary to loosen the nuts 22 to free the J bolts and lift the insert out of the pocket. In order to remove only the roller and pin assembly it is simply necessary to pull upwardly on the roller and pin assembly to move the pin end portions 24*b* upwardly out of the slots 18*g*.

The invention transfer grid insert will be seen to have many important advantages. Specifically, the simple construction of the insert allows the insert to be manufactured at a minimal cost so that the cost of the insert is more than compensated for by the savings in repair of the grid surface and the further savings realized by the avoidance of scouring of the undersurface of the plates; the invention insert allows the roller to be readily moved into a precise height corresponding to the plate pass plane and to be readily moved angularly into a precision position in which the circumferential surface of the roller is precisely parallel with the plate pass plane; the invention insert allows the roller to be removed for repair or replacement without requiring removal of the insert from the pocket; the invention insert may be quickly and readily fixedly secured to the cross members of the transfer grid by a simple tightening movement of a pair of nuts; and the simple mounting arrangement of the invention insert allows the insert to be quickly and readily mounted to cross members of the type including a lower flange portion as well as to cross members (as illustrated) without the lower flange portion.

Whereas a preferred embodiment of the invention has been illustrated and described in detail, it will be apparent that various changes may be made in the disclosed embodiment without departing from the scope or spirit of the invention.

We claim:

1. An insert for use with a generally horizontal cooling bed plate transfer grid including a plurality of longitudinal side grid members and a plurality of transverse cross grid members extending between the side grid members and coacting therewith to define a plurality of grid pockets each sized to removably receive an insert, wherein the insert includes:

- a housing defining a central upwardly opening roller slot and a pair of vertically extending upwardly opening guide slots at opposite sides of said central roller slot;
- means for removably positioning the housing in a respective pocket;
- a roller sized to be received in the central roller slot; and
- a pin having a central portion rotatably mounting the roller in the roller slot and opposite end portions respectively slidably disposed in said guide slots so that the pin and roller assembly may be mounted in the housing simply by lowering the pin end portions into the respective upwardly opening guide slots while lowering the roller into the upwardly opening central slot.

2. An insert according to claim 1 wherein:

- the insert further includes means for selectively moving the end portions vertically in the slots whereby to selectively adjust the distance between the top of the roller and the upper grid surface.

3. An insert for use with a generally horizontal cooling bed plate transfer grid including a plurality of longitudinal side grid members and a plurality of transverse cross grid members extending between the side grid members and coacting therewith to define a plurality of grid pockets each sized to removably receive an insert, wherein the insert includes:

- a housing;
- means for fixedly but removably positioning the housing in a respective pocket;
- a roller; and
- means mounting the roller on the housing for rotation about a transverse axis and operative to selectively adjust the position of the roller relative to the housing, the mounting means including means for selectively angularly moving the transverse axis of the roller whereby to maintain the circumferential surface of the roller parallel to the upper grid surface.

4. An insert for use with a generally horizontal cooling bed plate transfer grid including a plurality of longitudinal side grid members and a plurality of transverse cross grid members extending between the side grid members and coacting therewith to define a plurality of grid pockets each sized to removably receive an insert, wherein the insert includes:

a housing having front and rear flange portions adapted to be respectively seated on successive cross members and a central main body portion sized to fit in the pocket between the successive cross members;

a roller;

means mounting the roller on the main body portion of the housing;

a clamp member mounted on each flange portion and including a vertical bolt shank having a threaded upper end extending through an opening in the respective flange portions; and a lock nut positioned above each flange portion, threadably engaging the threaded upper end of a respective bolt shank, and operative in response to threaded coaction between the nut and bolt shank to move the clamp member into clamping engagement with an undersurface of the respective cross member to clamp the respective cross member between the respective clamp member and the respective housing flange portion;

the mounting means mounting the roller on the housing for rotation about a transverse axis and including means for selectively angularly moving the transverse axis of the roller whereby to maintain the circumferential surface of the roller parallel to the grid surface.

5. An insert according to claim 3 wherein;

the moving means further includes means for selectively moving the roller vertically relative to the housing whereby to selectively adjust the distance between the top of the roller and the upper grid surface.

6. An insert according to claim 5 wherein the mounting means includes:

a pair of vertically extending slots defined by said housing and positioned on opposite sides of the roller; and a pin having a central portion mounting the roller and opposite end portions respectively slidably disposed in said slots, whereby joint slidable movement of said end portions in said slots translatorily adjusts the vertical position of the roller relative to the housing and differential movement of said end portions in said slots angularly adjusts the transverse axis of the roller relative to the housing.

7. An insert according to claim 6 wherein;

each slot is bounded by a bottom wall; and the mounting means further includes a pair of vertically extending screws threadably engaging the respective end portions of the pin and engaging the respective bottom walls at the lower ends of the screws.

8. An insert according to claim 7 wherein;

each slot has an open top so that the pin and roller assembly may be mounted in the housing simply by lowering the pin end portions into the respective slots, the roller may be vertically adjusted relative to the housing by joint rotation of the screws, the roller axis may be angularly adjusted relative to the housing by differential rotation of the screws, and the pin and roller assembly may be removed from the housing for repair or replacement simply by raising the pin end portions upwardly out of the slots.

9. An insert for use with a generally horizontal cooling bed plate transfer grid including a plurality of longitudinal side grid members and a plurality of transverse cross grid members extending between the side grid members and coacting therewith to define a plurality of grid pockets each sized to removably receive an insert, wherein the insert includes:

a housing having front and rear flange portions adapted to be respectively seated on successive cross members and a central main body portion sized to fit in the pocket between the successive cross members;

a roller;

means mounting the roller on the main body portion of the housing; and a clamp assembly mounted on each flange portion, each clamp assembly including a J-bolt and a lock nut, each J-bolt including a vertical bolt shank having a threaded upper end extending through an opening in the respective flange portion and a lower horizontal clamp portion extending laterally from the lower end of the bolt shank, each lock nut positioned above the respective flange portion, threadably engaging the threaded upper end of a respective J-bolt shank, and operative in response to threaded coaction between the nut and bolt shank to move the lower horizontal clamp portion of the respective J-bolt into clamping engagement with an undersurface of the respective cross member to clamp the respective cross member between the respective horizontal clamp portion and the respective housing flange portion.

10. An insert according to claim 9 wherein:

the mounting means mounts the roller on the housing for rotation about a transverse axis and is operative to selectively adjust the position of the roller relative to the housing.

11. An insert according to claim 10 wherein:

the mounting means includes means for selectively moving the roller vertically relative to the housing whereby to selectively adjust the distance between the top of the roller and the upper grid surface.

12. An insert according to claim 4 wherein:

the mounting means further includes means for selectively moving the roller vertically relative to the housing whereby to selectively adjust the distance between the top of the roller and the upper grid surface.

13. An insert according to claim 12 wherein the mounting means includes:

a pair of vertically extending slots defined by said housing and positioned on opposite sides of the roller; and a pin having a central journal portion mounting the roller and opposite end portions respectively slidably disposed in said slots, whereby joint slidable movement of said end portions in said slots translatorily adjust the vertical position of the roller relative to the housing and differential movement of said end portions in said slots angularly adjusts the transverse axis of the roller relative to the housing.

14. An insert according to claim 13 wherein:

each slot is bounded by a bottom wall; and the mounting means further includes a pair of vertically extending screws threadably engaging the respective end portions of the pin and engaging the respective bottom walls at the lower ends of the screws.

15. An insert according to claim 14 wherein:

each slot has an open top so that the pin and roller assembly may be mounted in the housing simply by lowering the pin end portions into the respective slots, the roller may be vertically adjusted relative to the housing by joint rotation of the screws, the roller axis may be angularly adjusted relative to the housing by differential rotation of the screws, and the pin and roller assembly may be removed from the housing for repair or replacement simply by raising the pin end portions upwardly out of the slots.

* * * * *